(Model.)

M. G. HUBBARD.
FRICTION CLUTCH.

No. 362,084. Patented May 3, 1887.

Attest:
Geo. T. Smallwood.
Jas. K. McCathran.

Inventor:
Moses G. Hubbard,
By A. M. Smith, atty.

United States Patent Office.

MOSES G. HUBBARD, OF PHILADELPHIA, PENNSYLVANIA.

FRICTION-CLUTCH.

SPECIFICATION forming part of Letters Patent No. 362,084, dated May 3, 1887.

Application filed October 16, 1886. Serial No. 216,403. (Model.)

*To all whom it may concern:*

Be it known that I, MOSES G. HUBBARD, of Philadelphia, county of Philadelphia, and State of Pennsylvania, have invented a new and useful Improvement in Friction-Clutches, of which the following is a full, clear, and exact description, reference being had to the accompanying drawings, making part of this specification.

My invention relates to an improved automatically-acting friction-clutch for coupling a wheel to its shaft when moving in one direction and for uncoupling or releasing the same from said shaft when moving in the opposite direction, forming what is known as a "backing ratchet" or "clutch" and adapting a machine-shaft or driving-wheel with which it is connected to be backed or its movement reversed while the mechanism ordinarily operated thereby in its usual forward movement remains at rest or continues its forward movement.

To enable others to understand my invention, I will describe it with reference to the accompanying drawings, in which—

Figure 1:
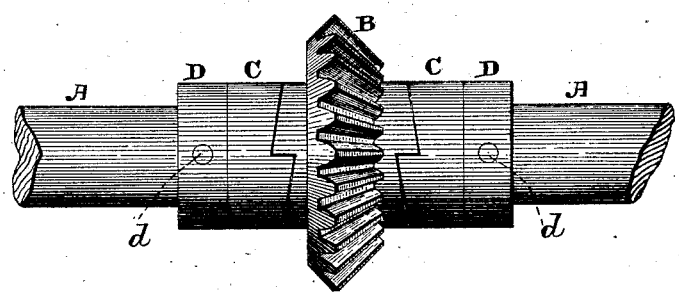
Figure 2:
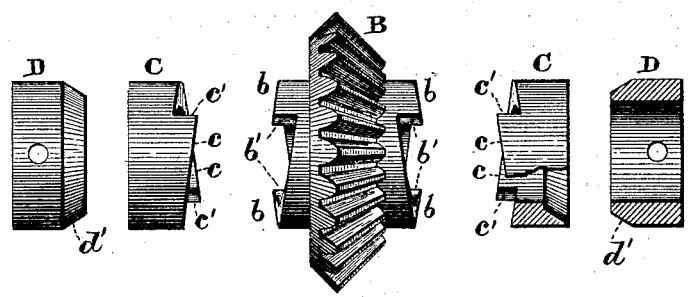
Figure 3:
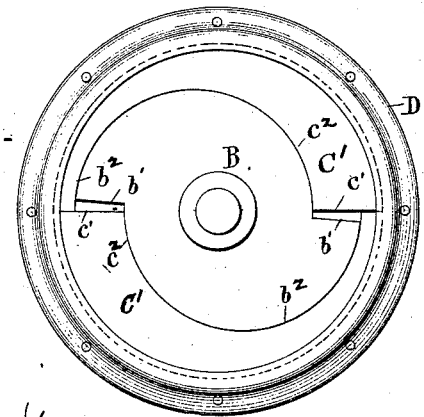
Figure 4:
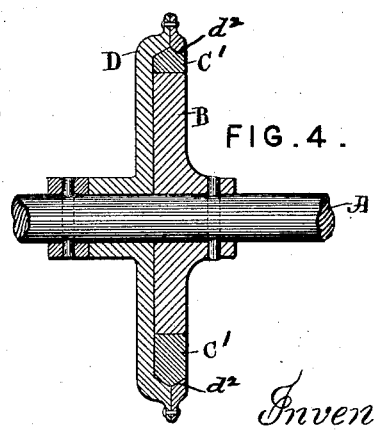

Figure 1 represents a side elevation of a portion of a shaft with my improved clutch applied, and Fig. 2 a similar view of the parts (some of them in section) of the clutch removed from the shaft and separated from each other. Figs. 3 and 4 show a modified form of the clutch employing radially-acting inclines.

A indicates a shaft, and B a gear-wheel mounted loosely thereon. The hub of the wheel B has inclined cam-faces $b$ formed upon its ends, either or both, and preferably on diametrically-opposite sides of the shaft, as indicated in Fig. 2, in such manner as to act simultaneously on opposite sides of corresponding cam-faced collars C, also mounted loosely on the shaft A, and thereby giving to or receiving from said collars a direct lateral thrust. The inclines or cams $b$ on the hub of wheel B and the cams $c$ on the collars C terminate in square shoulders at $b'$ and $c'$, those on the collar facing and abutting when the shaft or wheel is backed against those on the wheel-hub.

D D indicate collars on the shaft A, outside of the loose collars C, and secured to the shaft by pins $d$, or in any other suitable manner, whereby they are made rigid on said shaft. The ends of the collars D, against which the collars C abut, are, by preference, made tapering, as shown at $d'$, or in the form of a truncated hollow cone, and the collars C are correspondingly recessed in their ends adjacent thereto for giving greater frictional adhesion with a given pressure and increased frictional surface to said abutting ends.

The operation of the clutch will be readily understood. When the wheel or the shaft, whichever is made the driving medium, is rotated in such direction as to cause the inclined cam-faces $b$ to act against the cams $c$ on the collars C, the latter will be wedged outward from the wheel B and against the fixed collars D with such force as to insure the rotation of the shaft with the wheel, and vice versa; but when the movement of the driving wheel or shaft is reversed the square shoulders $b'$ and $c'$ will be made to abut one against the other, thereby relieving the inclines from the wedging action described, and the collars C and wheel B will be loose on the shaft and free to be rotated in the reverse direction, or to remain stationary.

The loose collar and the inclines operating thereon may be dispensed with on one side of the wheel or wheel-hub for some uses with the same result; but ordinarily it is preferred to use the loose collars and cams on both ends of the wheel-hub, as by this arrangement frictional resistance to the release of the clutch is greatly reduced, as the opposing inclined faces immediately separate and leave the collars C and wheel B free on the axle.

The advantage of this construction will be apparent. The objectionable clicking noise incident to the use of the ordinary backing-ratchet with pawls is done away with. The clutch is automatic and purely frictional in its action as a clutch, and is always in position to act instantaneously when the direction of rotation corresponds with that in which the parts are set to operate.

Instead of forming the cams $b$ on the ends of the hub of wheel B, they may be formed on the periphery of the said hub, as indicated at $b^2$ in Figs. 3 and 4, and the loose rings indicated at C' C', made in sections and located around the said cams, and having corresponding cams $C^2$ on their inner faces, and V-shaped friction-clutch surfaces $d^2$ formed on their periphery and on the inside of the rim on the wheel B, causing the pressure in a radial direction, instead of a lateral pressure. This form of my invention might be used when there is not room in a lateral direction for the arrangement previously described, and shown in Fig. 1. These clutches are often used where they are exposed to dust and dirt that might interfere with their action. In such positions the radial clutch might be preferable, unless the lateral pressing-clutch should be protected, which may be conveniently done by inclosing it in light cylindrical casings attached to the wheel B or to the stationary collars D D.

My invention consists in the construction and arrangement of an automatic friction-clutch having the cam-surfaces $b$ and $c$ formed at such an angle or incline as to release readily in one direction, and yet permit them to slide upon each other in the opposite direction easier than the friction-clutch surfaces $d'$, whereby the said friction-clutch surfaces will be pressed together with a force proportioned to the power applied with a free release in the opposite direction.

Having now described my invention, I claim as new—

1. The combination, with a shaft provided with fixed collars having inclined abutting surfaces, of a wheel mounted loosely on said shaft, and a collar, also mounted loosely on said shaft and provided with inclined abutting surfaces, and inclines or cams operating in connection with corresponding inclines or cams for forcing the wheel into frictional engagement with the shaft, substantially as described.

2. In a friction-clutch, the combination, with the shaft A, of the wheel B and collar C, mounted loosely on said shaft, and provided with the opposing inclines or cams $b$ and $c$ and inclined abutting faces, and the fixed collars D, provided with the inclined abutting faces $d'$, substantially as and for the purpose described.

3. The combination, in a friction-clutch, of the wheel B, having its hub provided with cam-faces, ends, or inclines $b$, the collars C C, loose on the shaft A and having corresponding cam-faced ends $c$, and the fixed collars D D, provided with the inclined abutting faces $d'$, engaging corresponding faces on the collars C C, arranged and operating substantially as described.

4. In an automatic friction-clutch, a wheel provided with cam-faces, in combination with a loose segment or collar having cam-faces and provided with inclined abutting surfaces, through which the inclined or cam faces act to hold said wheel in frictional engagement with its shaft, substantially as described.

In testimony whereof I have hereunto set my hand this 1st day of September, A. D. 1886.

MOSES G. HUBBARD.

Witnesses:
M. G. HUBBARD, Jr.,
CHARLES H. MINTZER.